US010055458B2

(12) United States Patent
Sun et al.

(10) Patent No.: US 10,055,458 B2
(45) Date of Patent: Aug. 21, 2018

(54) DATA PLACEMENT CONTROL FOR DISTRIBUTED COMPUTING ENVIRONMENT

(71) Applicant: Futurewei Technologies, Inc., Plano, TX (US)

(72) Inventors: Jason Yang Sun, Palo Alto, CA (US); Guogen Zhang, San Jose, CA (US); Le Cai, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 306 days.

(21) Appl. No.: 14/813,668

(22) Filed: Jul. 30, 2015

(65) Prior Publication Data

US 2017/0031988 A1 Feb. 2, 2017

(51) Int. Cl.
*G06F 17/30* (2006.01)

(52) U.S. Cl.
CPC .. *G06F 17/30466* (2013.01); *G06F 17/30486* (2013.01)

(58) Field of Classification Search
None
See application file for complete search history.

(56) References Cited

U.S. PATENT DOCUMENTS

| 7,475,199 | B1 * | 1/2009 | Bobbitt | G06F 17/30079 |
| | | | | 707/999.202 |
| 7,702,850 | B2 * | 4/2010 | Ludwig | G06F 3/0607 |
| | | | | 711/114 |
| 9,569,513 | B1 * | 2/2017 | Vig | G06F 17/30575 |
| 2005/0262110 | A1 * | 11/2005 | Gu | G06F 17/30315 |
| 2011/0055621 | A1 | 3/2011 | Mandagere et al. | |
| 2012/0310916 | A1 * | 12/2012 | Abadi | G06F 17/30445 |
| | | | | 707/713 |
| 2012/0317093 | A1 | 12/2012 | Teletia et al. | |
| 2014/0059310 | A1 * | 2/2014 | Du | G06F 3/065 |
| | | | | 711/162 |
| 2015/0039626 | A1 | 2/2015 | Sen et al. | |
| 2015/0088827 | A1 * | 3/2015 | Xu | G06F 17/30215 |
| | | | | 707/634 |

FOREIGN PATENT DOCUMENTS

CN 103106249 A 5/2013

OTHER PUBLICATIONS

Ghemawat, Sanjay, et al., "The Google File System", SOSP '03 Proceedings of the Nineteenth ACM Symposium on Operating Systems Principles, vol. 37, Issue 5, (Dec. 2003), 29-43.
White, Tom, "Hadoop: The Definitive Guide", Third Edition, May 2012, p. 43-55, p. 339-347, (May 2012), 22 pgs.
"International Application Serial No. PCT/CN2015/086693, International Search Report dated Apr. 25, 2016", 4 pgs.
"International Application Serial No. PCT/CN2015/086693, Written Opinion dated Apr. 25, 2016", 4 pgs.

* cited by examiner

*Primary Examiner* — Son T Hoang
(74) *Attorney, Agent, or Firm* — Schwegman Lundberg & Woessner, P.A.

(57) ABSTRACT

A method includes dividing a dataset into partitions by hashing a specified key, selecting a set of distributed file system nodes as a primary node group for storage of the partitions, and causing a primary copy of the partitions to be stored on the primary node group by a distributed storage system file server such that the location of each partition is known by hashing of the specified key.

12 Claims, 9 Drawing Sheets

DATA PLACEMENT CONTROL FOR DISTRIBUTED COMPUTING ENVIRONMENT

FIELD OF THE INVENTION

The present disclosure is related to a distributed computing environment and in particular to control of data placement in nodes of the distributed computing environment.

BACKGROUND

Hadoop is a software framework for storing and processing a large amount of data in a distributed fashion on large clusters of commodity hardware. It provides massive data storage and parallel data processing.

Hadoop data stores (such as Hive and Hbase) are built on top of Hadoop distributed file system (HDFS) where HDFS provides scalable and reliable data storage. HDFS is designed to span large clusters of commodity servers and automatically replicate data for availability. On one hand, HDFS provides access and location transparency for data. On the other hand, the control of data placement is lost from the data store, and the efficiency and performance of queries in those data stores suffers. HDFS by default writes a copy of data locally where a client connects to the data store when writing a file and chooses the location of a replica of the data based on some system heuristics.

Some measures and technique have been taken by those data stores to remedy the situation; but, they still fall short when compared to traditional massively parallel processing (MPP) databases. For example, Hive supports bucketed table where a table is divided into buckets through clustering of keys, but the placement of buckets is still somewhat random based on HDFS heuristics. HBase stores rows of data in tables. Tables are split into chunks of rows called "regions" which are continuous ranges within the key space. Ranges can be user specified or auto generated. Even when tables are split into continuous ranges, joins are still performed by inefficiently shuffling data among all nodes with data.

SUMMARY

A method includes dividing a dataset into partitions by hashing a specified key, selecting a set of Hadoop nodes as a primary node group for storage of the partitions, and causing a primary copy of the partitions to be stored on the primary node group by a distributed storage system file server such that the location of each partition is known by hashing of the specified key.

A system includes a processor and a memory device coupled to the processor and having code stored therein to cause the processor to perform a method. The method includes dividing multiple datasets into partitions by hashing a specified key, selecting sets of distributed file system nodes as primary node groups for storage of the partitions, and causing a primary copy of the partitions of each dataset to be stored on corresponding primary node groups by a distributed storage system file server such that the location of each partition is known by hashing of the specified key.

A method includes receiving a query, inspecting the query to identify tables being joined and join conditions, identifying partition groups organized using distributed hash tables on a key and their sizes associated with multiple tables corresponding to the join conditions, performing a collocated join plan if an equi-join predicate is on partition keys, constructing a collocated join plan if the partition groups are the same, constructing a partition-wise join plan for bracketed exchange between nodes if the partition groups are not the same and if the size of the partition groups is not the same, constructing one or more logic partitions to match partitions in the groups, mapping partitions in a larger group to partitions in a smaller group, and constructing a partition-wise join plan for bracketed exchange between the nodes in the large and small groups based on the maps.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

There are several reasons that the query performance of Hadoop distributed data stores is still not as good as traditional massively parallel processing database (MPPDB) systems. Performance may be adversely affected by lack of statistics for query optimization and indexes for direct access. Lack of control on data placement is also a factor adversely affecting performance. Because of such factors, many optimization techniques available in traditional MPP database are not applicable in Hadoop based data stores.

In various embodiments, data is organized before being written to storage, and then written to multiple selected Hadoop nodes using a modified HDFS data placement strategy via an HDFS mechanism to overwrite a default data block placement, allowing a client to supply a BlockPlacementPolicy to specify where the data block should be placed. The placement strategy preserves advantages of Hadoop scalability and availability while in various embodiments, reducing data shuffling when joining tables, reducing the need for exchanges of data, allowing optimizers to devise better query plans to improve query performance, and providing for easier and faster merger and splitting of partitions when desirable.

Without loss of generality, in the example embodiments, table rows are assumed to be evenly distributed on join key columns. A distribution key or join key contains enough number of distinct values so that the number of rows on each node is roughly the same unless specifically said otherwise. The joins referenced herein are equi-joins on the distribution key unless otherwise specified. In one embodiment, equi-joins are joins which use equality comparisons in the join-predicate.

While Hadoop based data stores are referenced in many embodiments described, the methods are applicable to any type of distributed file (or storage) system that exposes file block locations through a client interface. Such systems may also support a large file block size. A distributed storage system, also referred to as a distributed file system, should allow data written through to primary nodes to stay on the primary nodes as much as possible.

Figure 1:
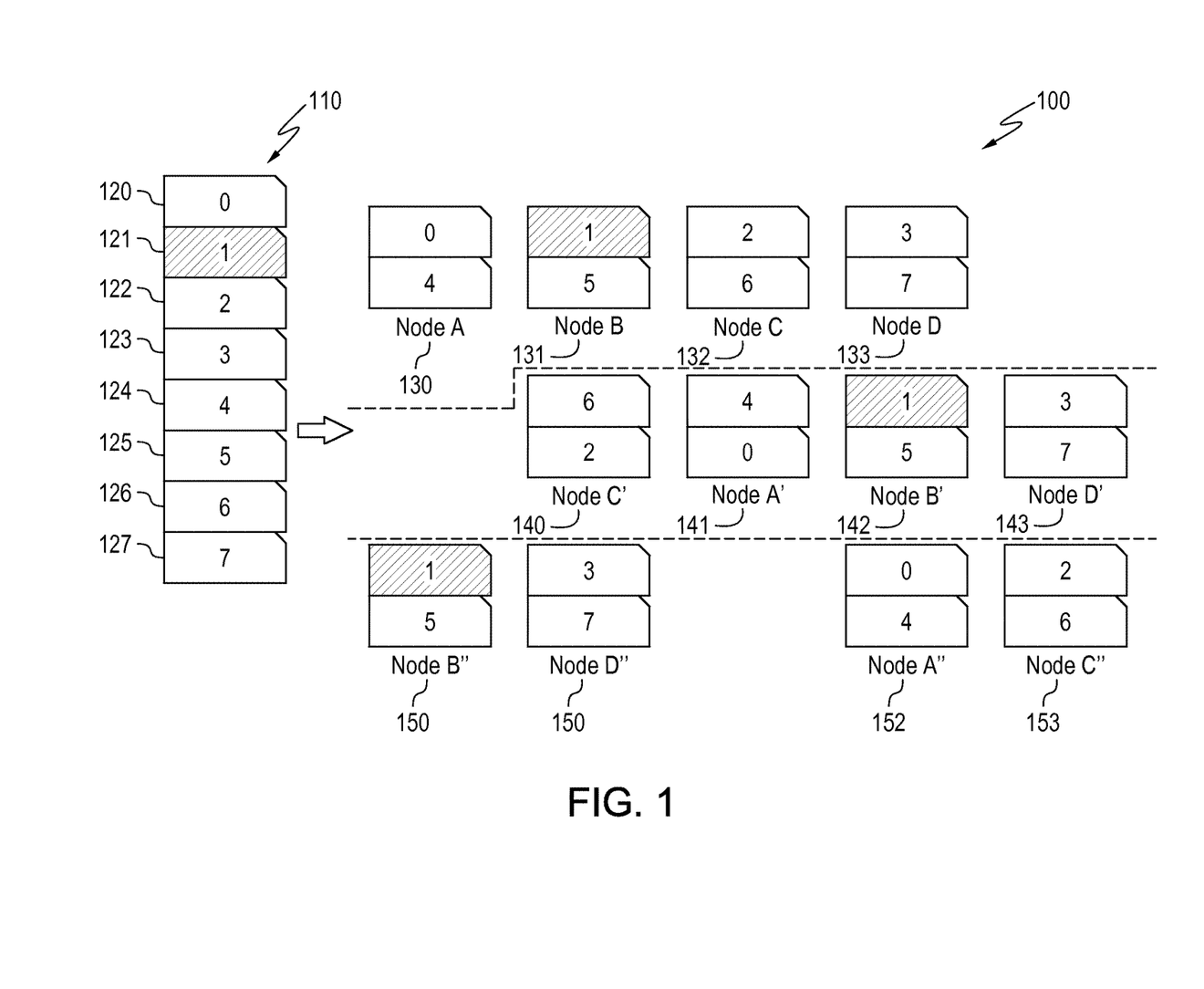
FIG. 1 is a graphic representation of one example of placement of data into nodes according to an example embodiment.

FIG. 1 is graphic representation of one example of placement of data into distributed storage system or Hadoop nodes generally at storage system 100. Storage system 100 contains a number of nodes that include storage mechanisms, for example hard disk drives, solid state drives, random access memory drives, or other storage mechanism and may also contain processing capabilities. These unique storage mechanisms are also referred to as storage nodes. The dataset 110 may be any data, such as a file, table, or database, and is organized by spitting the dataset into hash buckets indicated at 120, 121, 122, 123, 124, 125, 126, and 127 based on a key, such as a primary key that is unique for each record. The hash buckets may be grouped into partitions which may be stored on the nodes of the distributed storage system. In the example shown in FIG. 1, bucket 121 is shaded to solely to illustrate the partitions and nodes that the primary copy and replicas that the bucket is stored in. Each partition, may be assigned to a node or striped across multiple storage nodes A, B, C, and D as shown at 130, 131, 132, and 133. The set of nodes that hold all the partitions form a primary node group. The number of nodes in the primary node group may be a suitable subset of all of the Hadoop nodes that may correspond to the size of the dataset being stored. In some embodiments, a number of partitions formed may be a power of two for optimizing data exchange.

In FIG. 1, node 130 holds a partition that includes the values of hash buckets 120 and 124, node 131 holds a partition comprised of hash buckets 121 and 125, node 132 holds a partition comprised of hash buckets 122 and 126, and node 133 holds a partition comprised of hash buckets 123 and 127. Note that further copies of each hash bucket, referred to as replicas, may be stored according to heuristics utilized by Hadoop to provide high availability and data redundancy, so they may appear randomly distributed in FIG. 1. In the case a primary copy of data is not available, a replica can still be accessed through the primary node although under reduced performance (higher latency and lower throughput). In some embodiments, a replica of the data may be stored in a replica group of nodes, with each replica node in the replica group mapped one to one with the nodes of the primary node group. Replica nodes may be selected to be exclusive of the nodes in the primary node group in some embodiments. Two replica groups of nodes are shown in FIG. 1 as a first replica group including nodes 140, 141, 142, 143, and a second replica group including nodes 150, 151, 152, 153. The groups of nodes are separated by broken lines for clarity and are labeled as A', B', C' and D' for the first replica group and A", B", C", and D" for the second replica group. The replica nodes may be used to replace a primary group node that is not otherwise available for query execution.

In further embodiments, the number of hash buckets and nodes in each group may vary significantly. The storage size of hash buckets may vary significantly and likely increase with ever-increasing storage device capacities. Each hash bucket is broken into fixed size (e.g. 64 Mbytes) storage blocks. Exact size is depending on the implementation and is configurable. While one file was shown in FIG. 1, multiple files may each be stored in the same or different primary node groups. When hashed via the same key, several opportunities for query optimization arise, especially for queries involving join operations.

A hash function on a key is used by a client system to divide the data into buckets and then into partitions so that determining the location of rows can be easily done by computing a hash value from the row key. The hash value space (the number of different hash values that can be generated by the type of hash function used) is divided into a fixed number of buckets. The number of buckets may be chosen by the client system performing the hash and allocating buckets to partitions. The number of buckets may change over time in some embodiments. A mapping between hash buckets and partitions is maintained and referred to as a hash map. A hash map is kept for each node group. Each hash bucket may cover a range of hash values or a list of hash values in various embodiments.

The same hash may be used later for optimizing equi-joins to minimize data movement during performance of equi-joins by identifying data to move between nodes so that corresponding hash bucket are in the same node for a join if the hash buckets are not already there. In one embodiment, join conditions contain an equality predicate on the partition key columns of the two tables. If the data were to be randomly divided into buckets, then optimization would result in a compare on every bucket to complete the same join. The hash algorithm obviates the need for a compare on every bucket. The same join optimization technique can also be used for range or list partitioned tables, as long as the partition boundary for each partition of one table matches that of the other table.

Figure 2:
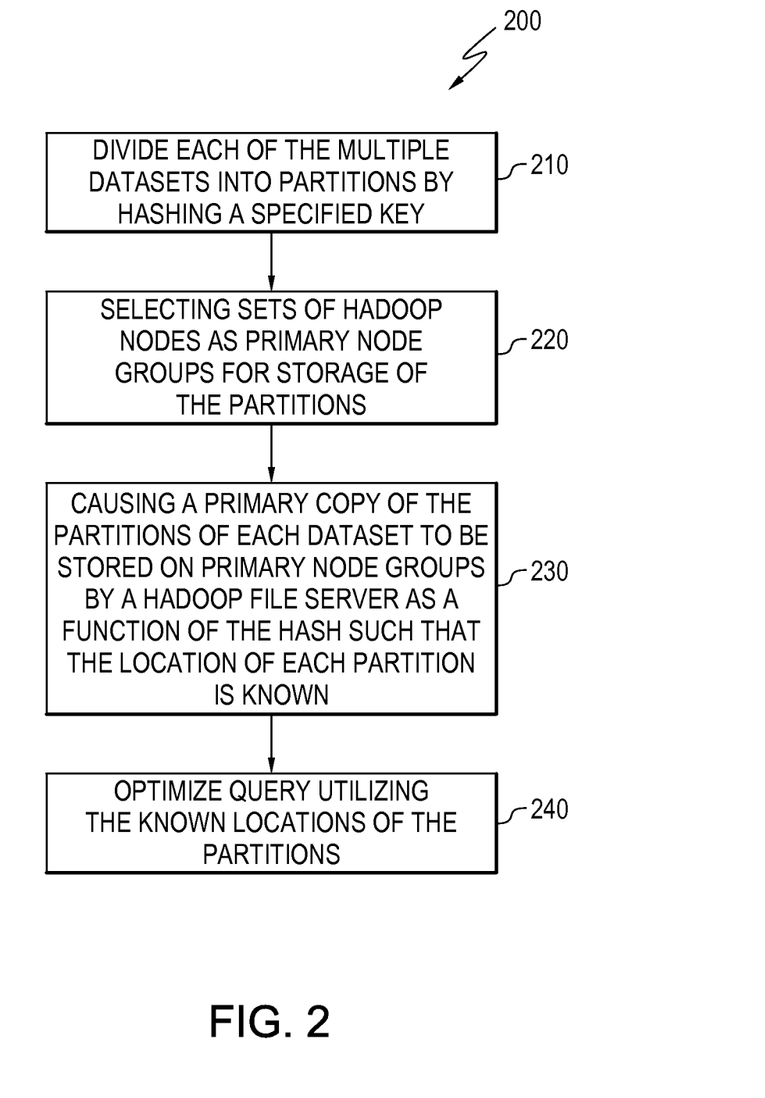
FIG. 2 is a flowchart illustrating a method of dividing datasets into partitions according to an example embodiment.

FIG. 2 is a flowchart illustrating a method 200 of dividing datasets into partitions according to an example embodiment. Method 200 begins at 210 by dividing each of multiple datasets into partitions by hashing a specified key that is common to the multiple datasets. At 220, sets of Hadoop nodes are selected as primary node groups for storage of the partitions. Method 200 continues at 230 by causing a primary copy of the partitions of each dataset to be stored on corresponding primary node groups by a Hadoop file server as a function of the hash such that the location of each partition is known via the hash table. In other words, the hashing of the specified key correlates to a known location of the corresponding data.

In one embodiment, method 200 may then optimize queries as indicated at 240 utilizing the known locations of partitions. Such optimization may include optimizing a query that includes a join over the multiple datasets by performing data shuffles between the partitions where partition groups are different or contained striped partitions.

Figure 3:
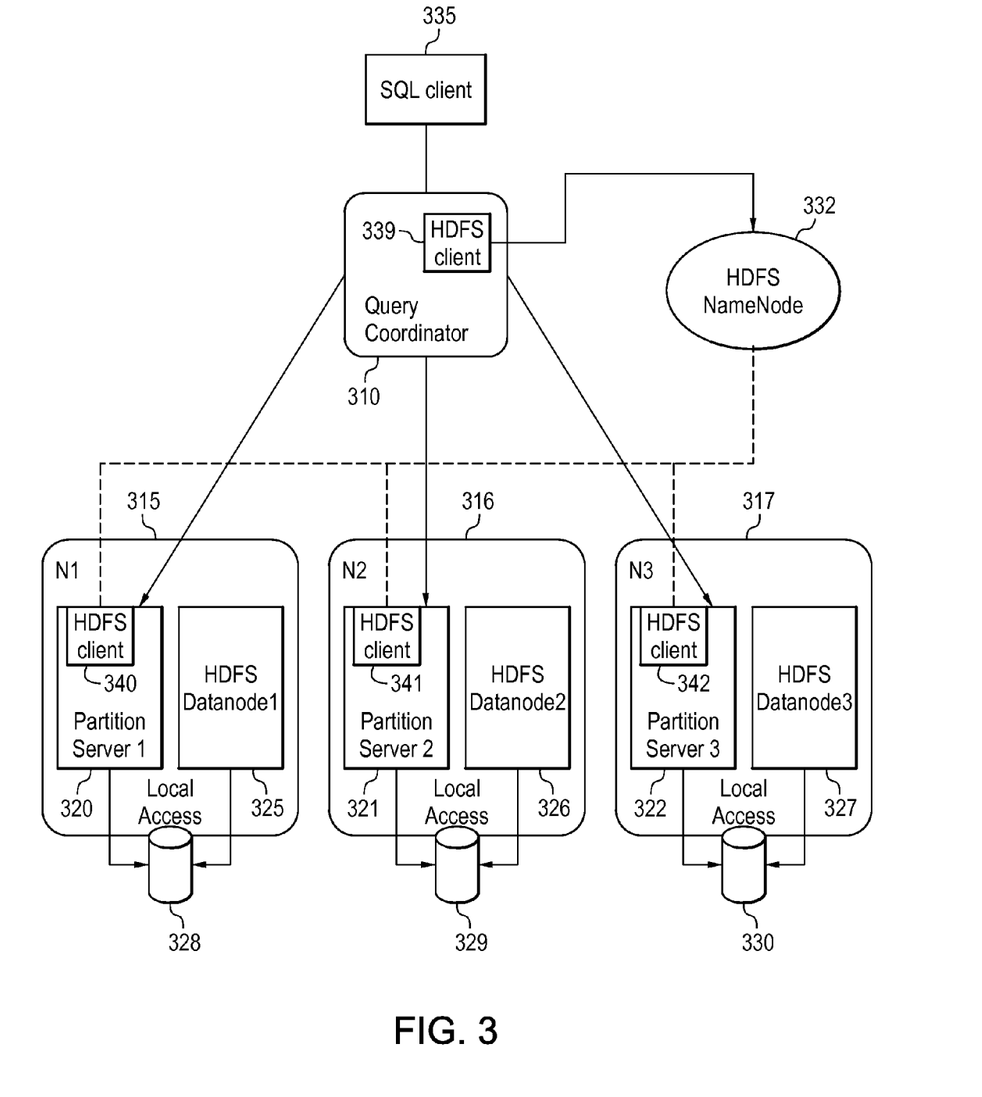
FIG. 3 is a block diagram of an architecture that provides database functions on a Hadoop system according to an example embodiment.

FIG. 3 is a block diagram of an architecture 300 providing database functions on a Hadoop system. A database coordinator 310 is shown coupled to several Hadoop nodes 315, 316, and 317, each having a partition server 320, 321, and 322. Each partition server is collocated with a HDFS data node 325, 326, and 327. Both the partition servers and HDFS data nodes have local access to data indicated at 328, 329 and 330. A user can define a partition group by specifying a list of partition servers. The number of servers in each partition group may be a power of 2 to facilitate data exchange during execution of queries as later described in further detail. One or more replica groups can also be defined for each partition group where the replica of files blocks will be stored. The servers in a replica group may be one to one mapped to the primary partition group.

A partition group may be associated with a database table when it is created in a distributed data store. When data is inserted into the table and is ready to be written to storage, such as a hard disk drive or semiconductor disk drive, the target data nodes are selected from a designated partition group and their replica group and the information is communicated to HDFS 332 using a pluggable DataPlacementPolicy Object in one embodiment.

In a standard HDFS file system, blocks are assigned to nodes based on built-in heuristics. Replica placement is also chosen on a different rack or data center based on heuristics. The built-in heuristics may be designed to maximize the data availability in case some nodes or racks go down. But from the data locality point of view, blocks and replicas may appear randomly placed.

Coordinator 310 in one embodiment comprises a database system that is responsive to queries from a structured query language (SQL) client indicated at 335. The coordinator 310 may include a query optimizer to determine query strategies to minimize resources consumed in executing the queries. In one embodiment, coordinator 310 contains an HDFS client 339 that communicates with HDFS 332 and corresponding HDFS clients in each node indicated at 340, 341, and 342. HDFS client 339 provides the coordinator access to DFS file metadata for planning query file block locations. An HDFS directory is created when a table is created in a database.

In a distributed system where data placement is random, the chance to optimize data exchange for joins (even for equi-joins which use equality comparisons in the join-predicate) is minimal. Either one table of a join is broadcast to all the nodes where the other table is located or both tables are redistributed based on the join key. This generates significant data traffic on the network. Consider the following example, a first table, table 1, is distributed on M nodes with a size of S1, and a second table, table 2, is distributed on N nodes with a size of S2 and there is no overlap between the nodes of table 1 and table 2. To join these two tables, one can choose to broadcast table 1 to nodes of table 2. The data volume to be moved is N*S1, and the join is done with a degree of parallelism of N. But if one chooses to redistribute the data among the M+N nodes for the join, the data volume to be moved is (M*S2+N*S1)/(M+N) and the join is also done with a degree of parallelism of (N+M), a significant amount of data has to be moved and each node has to communicate with (N+M−1) nodes for exchange data, consuming significant resources.

In a placement controlled distribution mode example embodiment, table rows are hashed on the distribution key, the hash space is divided into a large number of buckets, and several hash buckets are grouped together to form a partition. When the table is created, a group of nodes is designed to store the primary copy of the data. Each partition is assigned one node in the node group. A BlockPlacementPolicy that encodes the partition-to-node assignment information is passed to HDFS when writing a file of the partition to HDFS. This causes HDFS place the data block in the assigned node whenever possible. The bucket assignment algorithm is generally optimized to produce even-sized partitions for balancing the load of the system, but in practice skew exists where some partition contains disproportionally large number of rows. In the extreme case where the storage media on the assigned node is exhausted, HDFS will have to place the data block to some other nodes in the system where free storage is available, causing the partition to be striped.

Utilizing the enhanced data placement strategy, data exchanges used to perform equi-join on a key may be minimized. For example, join of two tables in the same partition group where no partition is striped becomes trivial. A traditional MPP join-optimization algorithm can be used to determine whether the join is a collocated join, in which no data exchange may be incurred. In the case where some partitions are striped across multiple nodes, the collocated join plan can still be used, but access to some data of striped partitions by assigned partition servers may be remote. The cost of remote access will be higher than local access. An alternative plan is a pair-wise join described below. And optimizer can compare the cost of both plan options and chose one with minimal cost, or the optimizer can simply pick the collocated join plan for simplicity.

Figure 4:
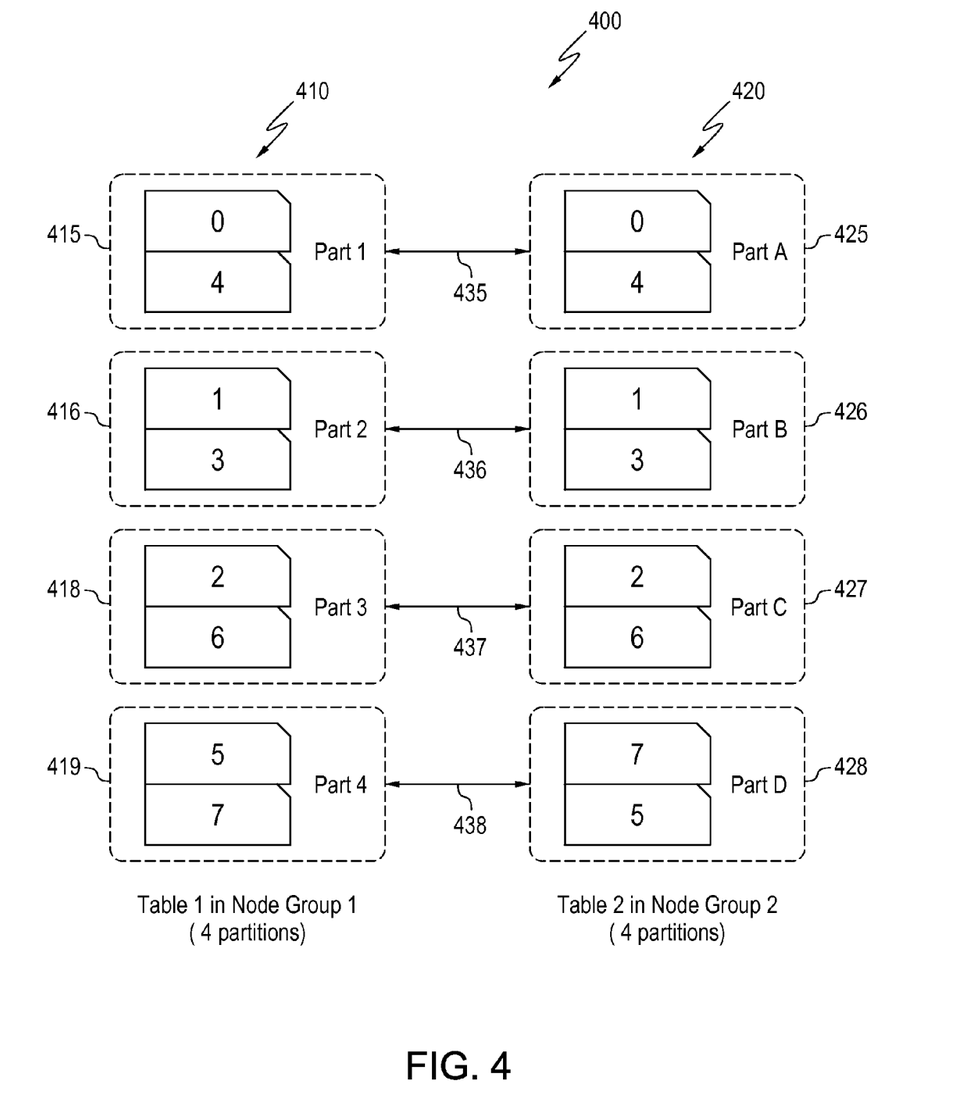
FIG. 4 is a block diagram illustrating a join of two tables from different partition groups wherein the size of the groups is the same according to an example embodiment.

A join of two tables from different partition groups wherein the size of the groups is the same may also be done with few data exchanges. For simplicity it is assumed that the nodes of different partition groups are not overlapped. On average the volume of data exchanged would be half compared to the case where tables are randomly distributed. Two such tables to be joined are illustrated generally at 400 in FIG. 4. A first table 410 has been divided into four partitions, 1, 2, 3, and 4 as indicated at 415, 416, 417, and 418. A second table 420 has also been divided into four partitions, A, B, C, and D as indicated at 425, 426, 427, and 428. The size of the groups is the same. The partitions in one group may exchange data with one partition in the other group as indicated by arrows 435, 436, 437, and 438 without exchanging with other groups. The mode for data exchange may be selected from several options by the query optimizer according to subsequent processing needs and cost of data movement if possible. For example to join partition (Part) 1 of table 1 with partition (Part) A of table 2, 3 choices of data movement can be used:
a) Move Part 1 to Part A;
b) Move Part A to Part 1;
c) Shuffle both Part A and Part 1.

Figure 5:
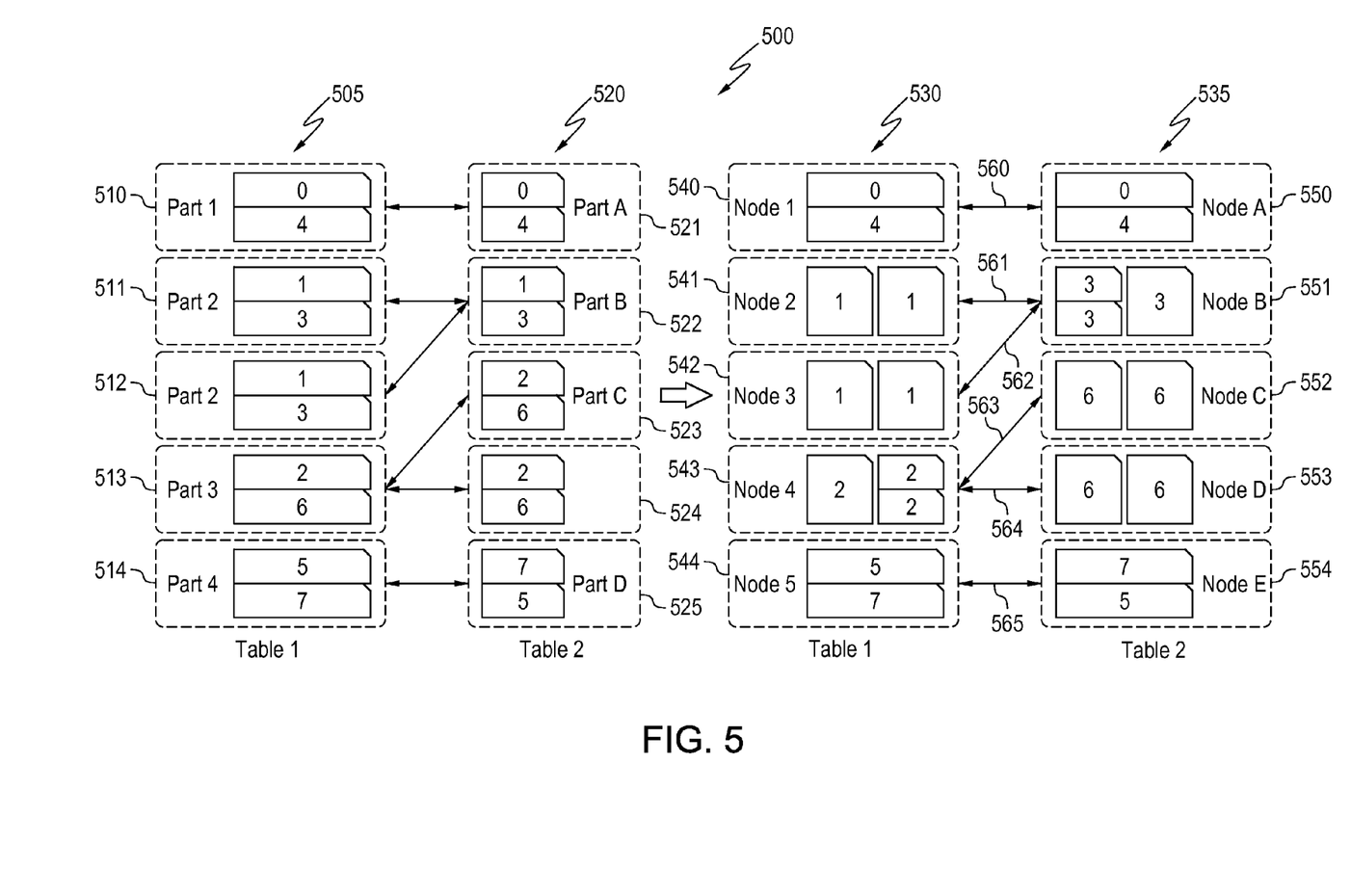
FIG. 5 is a block diagram illustrating table data distribution in partitions before after shuffling striped partitions according to an example embodiment.

When a hash partition does not fit in the assigned node, the hash partition may be striped across multiple nodes. When joining a regular partition with a striped partition or joining two striped partitions, both inputs are shuffled and the joins are done in parallel on all the nodes the input partitions reside in for balanced load. FIG. 5 is a block diagram illustrating table data distribution in partitions before after shuffling striped partitions generally at 500. A first table, Table 1 at 505, includes four partitions spreading over 5 nodes 510, 511, 512, 513, and 514, each including two hash buckets indicated by digits inside the partition representations. Note that partition 2 (which includes hash buckets 1 and 3) are spread between two nodes, 511 and 512. A second table, Table 2 at 520, also includes 4 partitions spread over 5 nodes 521, 522, 523, 524, and 525. As with the first table, partition 3 (which include hash buckets 2 and 6) are spread to two nodes 523 and 524 to help illustrate data movement for efficient execution of a join operation over the tables.

The result of shuffling is illustrated by shuffled versions of Table 1 at 530 and Table 2 at 535. Each table still contains the same number of partitions, which are identified with new reference numbers for clarity of reference. Table 1 nodes include 540, 541, 542, 543, and 544. Table 2 nodes include 550, 551, 552, 553, and 554. Bucket 1 (spread between nodes 511 and 522) from node 551 of Table 2 has been replicated to both nodes 541 and 542 to match up with bucket 1 of partition 2 of table 1, while splits of bucket 3 from node 541 and 542 are moved to node 551 to match up with bucket 3 of partition 2 of table 2. This may be referred to as a bracketed or pair-wise exchange between pair of partitions. Similarly, bucket 6 from partition 3 of Table 1 has been replicated to nodes 552 and 553 of Table 2, while splits of bucket 2 from 552 and 553 are moved to node 543 of table. Arrows 560, 561, 562, 563, 564, and 565 are shown to identify shuffling of data between partitions for execution of a join involving Tables 1 and 2. The bucket movement here is for illustration purpose only. The exact algorithm for moving data between a pair of table partitions may differ. For example, another hash function may be applied on the join key to redistribute the rows among the nodes that hold the data for the pair of table partitions.

A join of two tables from different partition groups, including where the size of the partition groups may be different, may also be performed. In such cases, the larger partition group is regrouped into a logical partition group, so that its size equals the size of the smaller group. This is to facilitate the construction of a pair-wise join plan. If the number of partitions is restricted to be a power of 2, mapping is straight-forward. Each partition in a smaller sized group ends up exchanging data with K number of partitions in the larger group where: K=size of (larger partition group)/size of (smaller partition group).

Figure 6:
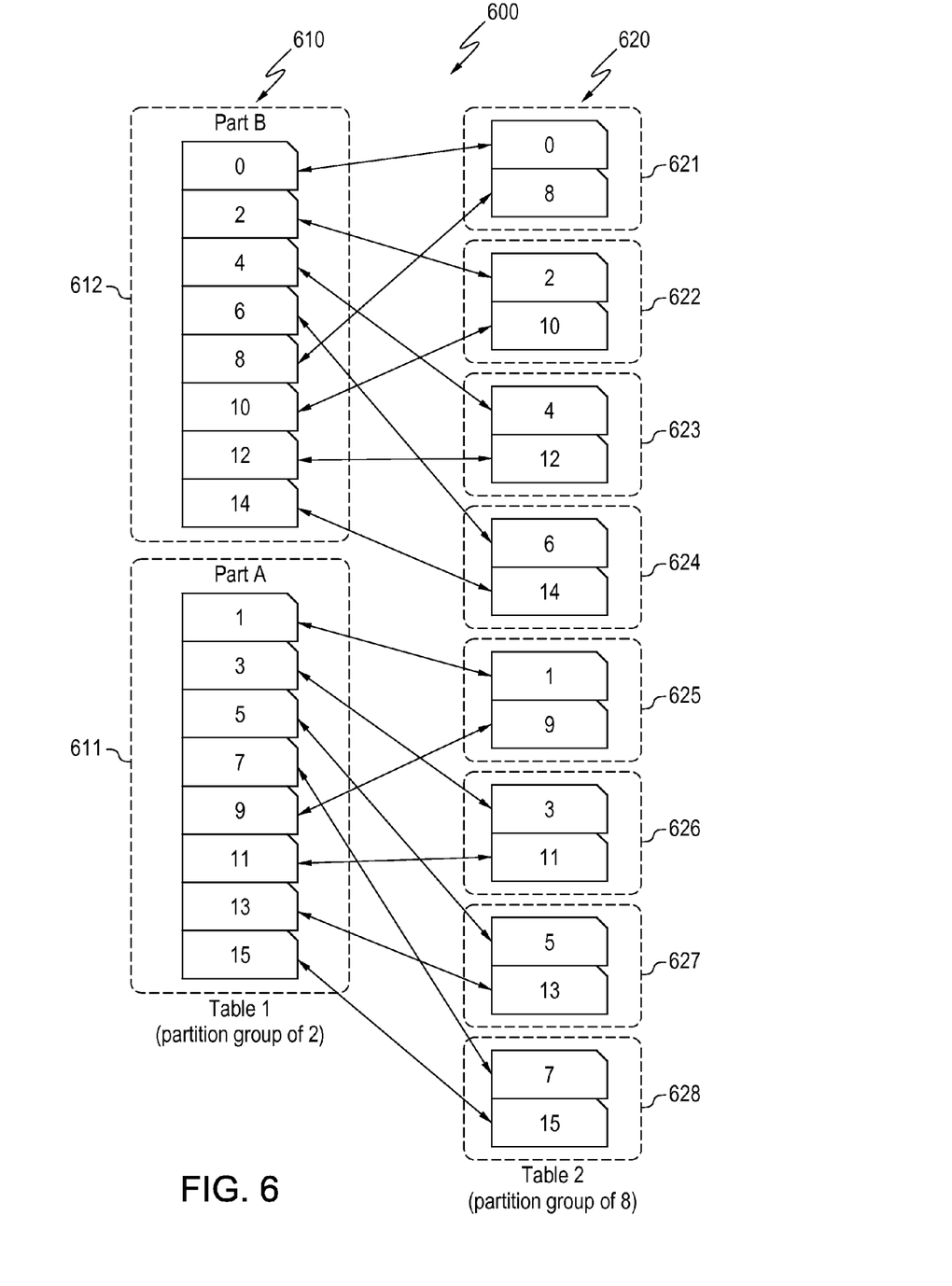
FIG. 6 is a block diagram representation illustrating a pair wise exchange pattern between a 2 partition group and an 8 partition group according to an example embodiment.

FIG. 6 is a block diagram representation illustrating a pair wise exchange pattern between a 2 partition group and an 8 partition group generally at 600. A first table, Table 1 at 610, includes two partitions A and B at 611 and 612 respectively. Table 1 includes hash buckets 1, 3, 5, 7, 9, 11, 13, and 15. Table 2 includes hash buckets 0, 2, 4, 6, 8, 10, 12, and 14. A second table, Table 2 at 620, includes eight partitions indicated at 621, 622, 623, 624, 625, 626, 627, and 628. Each partition includes two hash buckets as illustrated. Arrows are illustrated between the two sets of partitions to illustrate that partitions with the same sets of hash buckets exchange data. Partition 611 exchanges data with K partitions, corresponding to four partitions 625, 626, 627, and 628 having same sets of hash buckets, and partition 612 exchanges data with four partitions 621, 622, 623, and 624. Essentially, the partitions of Table 2 have been logically combined to match with partitions 611 and 612 and minimize the total number of pairs needed for data exchange.

Figure 7:
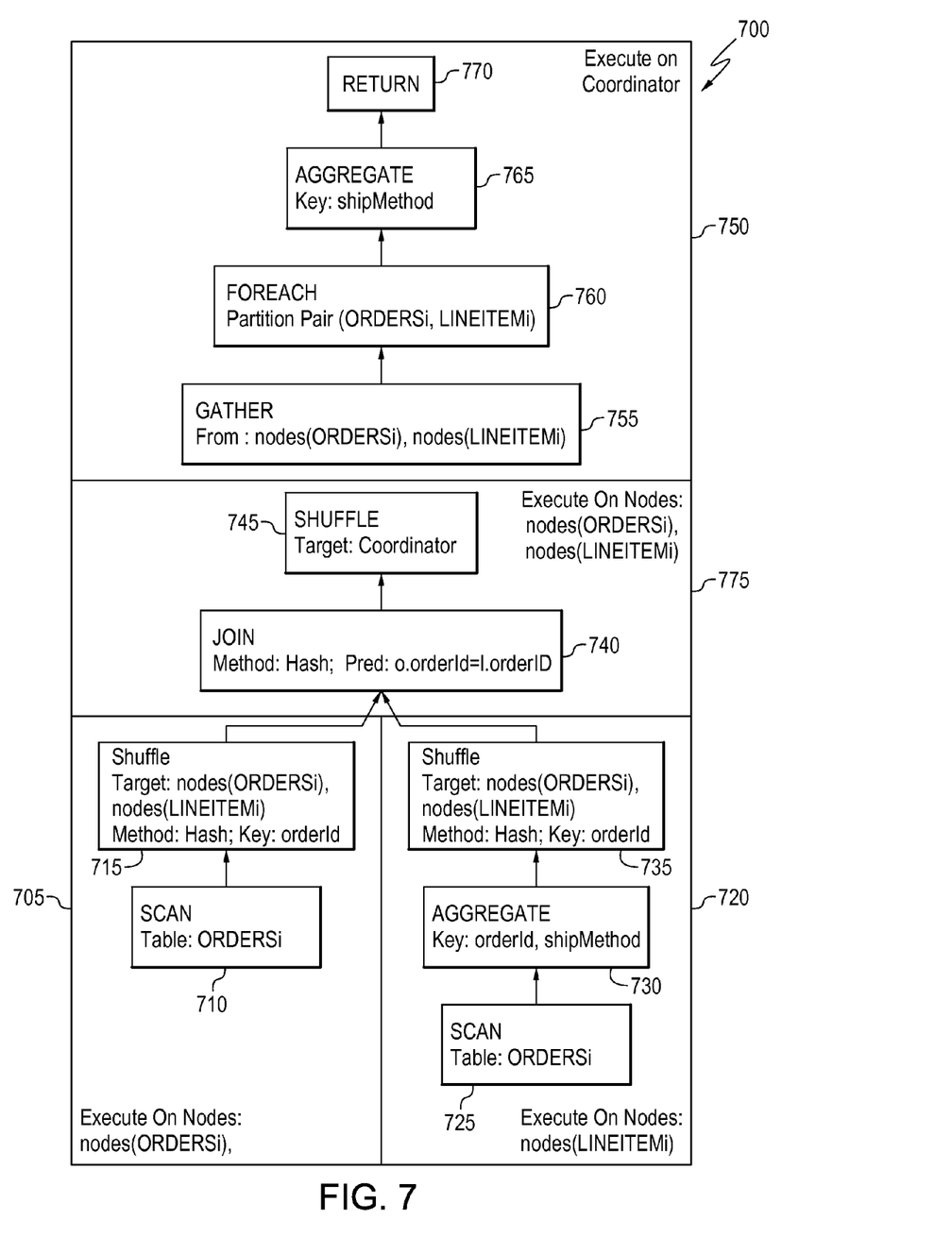
FIG. 7 is a flowchart illustrating a join plan that can take advantage of the optimized data exchange according to an example embodiment.

FIG. 7 is a flowchart illustrating a join plan 700 that can take advantage of the optimized data exchange. Each part of the plan is shown a segment with an indication of where each segment is to be performed. The plan may be generated by coordinator 210 in some embodiments, which also executes the first segment. The following query is used as an example:

Query—Select sum(amount)
from orders o join lineitem I
on o.orderid=I.orderid and
orderdate='dec 24, 2013'
group by shipMethod ORDERS and LINEITEM are tables defined in a Transaction Processing Performance Council (TPCH) benchmark that may be used to simulate a population of users executing transactions against a database.

In one embodiment, the plan 700 is a pair-wise join plan. In one embodiment, a first set of nodes 705 contains an ORDERS table. The first set of nodes 705 scans a partition (ith partition) ORDERS table at 710 and moves between the nodes that holds the ith partition of ORDERS table and the ith partition of LINEITEM table based on the hash key orderID using a hash function different from that used when the data is stored into the table at 715. Similarly, a second set of nodes 720 contains lineitems, and scans the ith partition of LINEITEM table at 725 and aggregates based on orderID and shipMethod at 730. The second set of nodes 720 moves the aggregate results between the nodes that holds the ith partition of ORDERS table and the ith partition of LINEITEM table based on the hash key orderID using above mentioned hash function.

At 740, both sets of nodes perform the join using a predicate of o.orderID=I.orderID. Result is moved to coordinator by Shuffles as indicated at 745. In a coordinator plan segment 750, information from the nodes is gathered at 755 and an iteration operator 760 (called iterator FOREACH) is added into the plan, which iterates over all the pairs of partitions (or logical partitions). The input of the iterator is the sub-plan starting from the Gather operator. Depending on the implementation, the iteration can be done sequentially or in parallel fashion. Results are finally aggregated based on shipMethod at 765 to form the query result and returned at 770.

In one embodiment, various segments of the query plan, referred to as a plan tree, are indicated as to be performed by different sets of nodes and the coordinator. At a leaf level of the plan tree, indicated at 705 and 720 and segments 3 and 4, the object to scan is the partitions of the tables instead of the table object itself, and the partitions are parameterized by an iteration variable (I in this case). Scanning may be executed on the nodes where the data for partition I resides. The target nodes of the shuffle operator are also similarly parameterized. A query plan segment 2 is indicated at 775, above the leaf nodes, and utilizes both groups of nodes to compute the join at 740 which may be parameterized to run on the nodes of its input partitions. At each iteration over the pairs of partitions, a sub plan is initialized with the parameters, and the set of nodes to execute the plan is recomputed before plan segments (segments for the sub-plan) are dispatched. The pair-wise join plan is available for equi-join on partition key queries.

Figure 8:
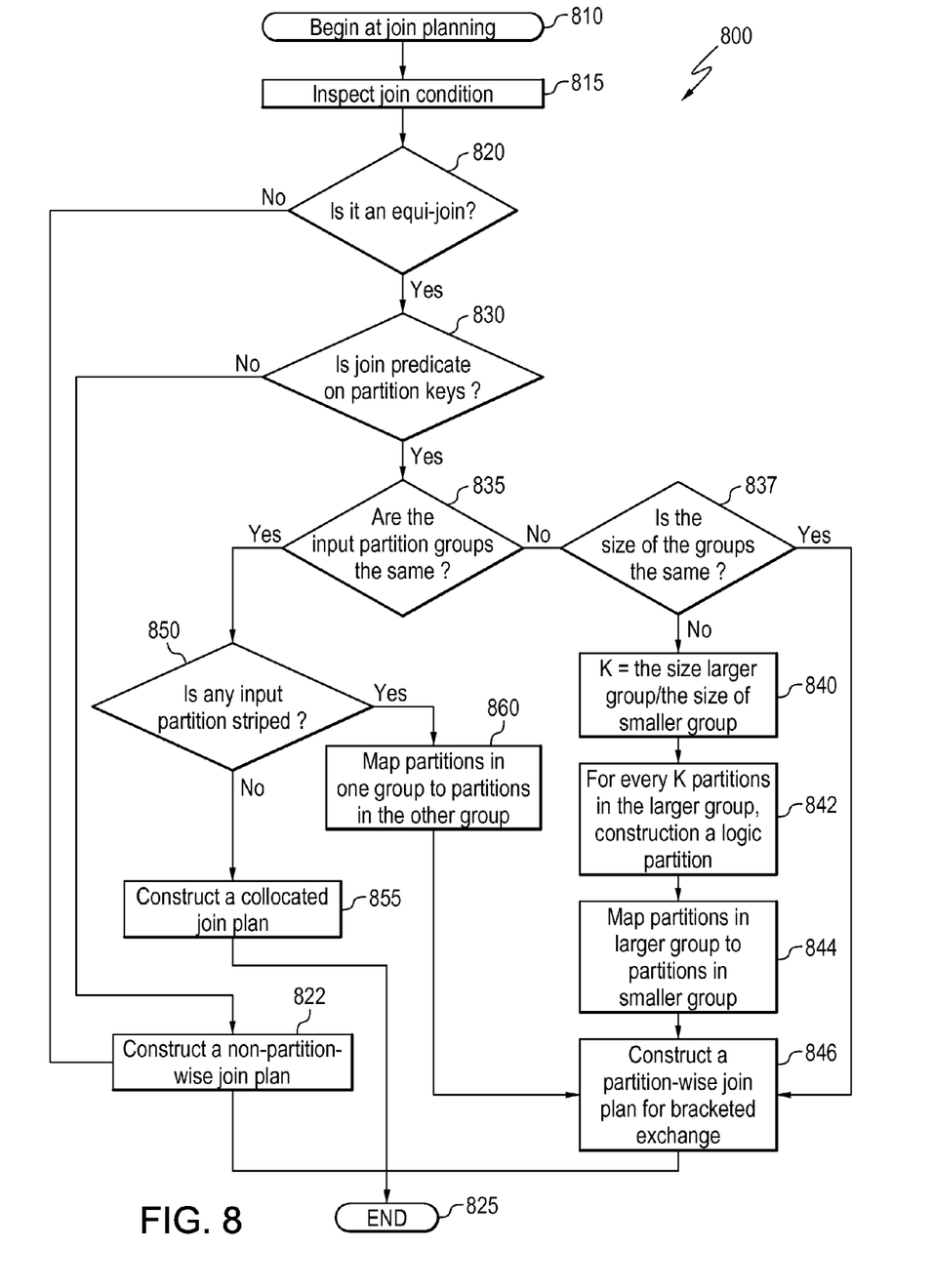
FIG. 8 is a flowchart illustrating a method of determining whether a join can make use of an optimized data exchange according to an example embodiment.

FIG. 8 is a flowchart illustrating a method 800 of determining whether a join can make use of an optimized data exchange. Method 800 begins at join planning as indicated at 810. A join inspection is performed at 815 to determine the type of join involved. At 820, a check is made to see if the join is an equi-join. If not, a non-partition-wise join plan is constructed at 822, and method 800 ends at 825. If at 820 the join is an equi-join, a further check is made at 830 to determine if the join predicate is on partition keys. If not, a non-partition-wise join plan is constructed at 822, and method 800 ends at 825. If at 830 the join predicate is on partition keys, a check is made at 835 to determine if the input partition groups is the same. If they are not the same, a check is made at 837 to determine the size of input partition groups is the same. If the size is the same, a partition-wise join plan for bracketed exchange is constructed at 846. If the size is not the same, at 840, K is defined as the size of the larger group divided by the size of the smaller group. At 842, for every K partitions in the larger group, a logical partition is constructed. At 844, partitions in the larger group are mapped to partitions in the smaller group. Finally at 846, a partition-wise join plan for bracketed exchange is constructed and method 800 ends at 825.

If at 835 the input partition groups are the same, a check is made at 850 to determine if any input partition is striped. If not, a collocated join plan is constructed at 855 and method 800 ends at 825. If yes, partitions in one group are mapped to partitions in the other group at 860, a pair-wise join plan for bracketed exchange is constructed at 846 and method 800 ends at 825.

In some embodiments, if the partition group contains many striped partitions, it may be desirable to expand the partition group and redistribute data. In some rare case where a significant amount of data are deleted from a set, contraction may also be desirable. This can be done efficiently with bracketed data exchange. Data may be shuffled within the logical partition group when expanding/contracting the partition groups.

Unlike HDFS which places data blocks randomly, the present data placement strategy distributes using a distributed hash table (DHT) within a defined node group, each hash partition has a designated host so the location of hash buckets are known (to the system), allowing hash partitions to be leveraged for query optimization A bracketed data exchange may be used to streamline data exchange. This limits the number of nodes each node has to communicate with for data exchange and reduces the potential resource consumption for data exchanges.

Compared to traditional MPPDB, where the node group is formed statically and generally not changed, the present data placement strategy defines a node group dynamically at the time a table is created according to the load factor of nodes, maintaining availability features of HDFS when managing replicated file blocks. Query plans may be optimized partition-wise. Different pairs of partitions may use different way for exchanging data. Data shuffle may be done in a more restricted fashion to reduce resource consumption.

Figure 9:
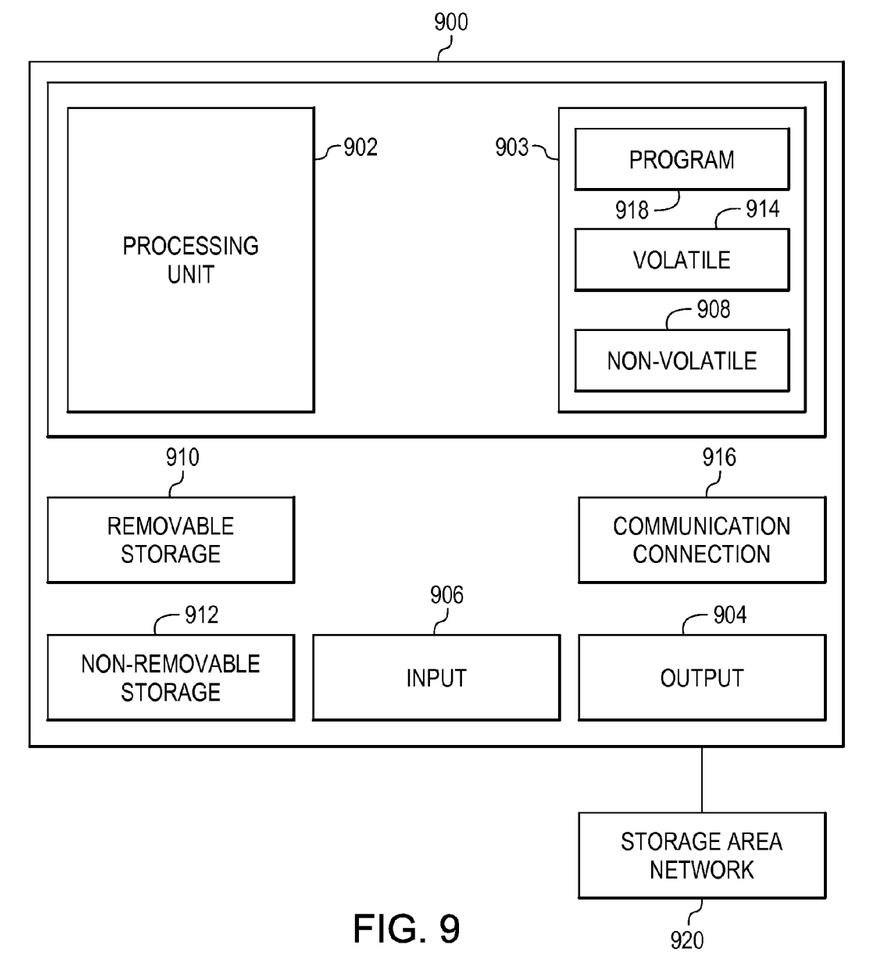
FIG. 9 is a block diagram illustrating circuitry for use in forming nodes and computer system for executing one or more methods according to example embodiments.

FIG. 9 is a block schematic diagram of a computer system 900 to implement methods according to example embodiments. All components need not be used in various embodiments. One example computing device in the form of a computer 900 may include a processing unit 902, memory 903, removable storage 910, and non-removable storage 912. Although the example computing device is illustrated and described as computer 900, the computing device may be in different forms in different embodiments. For example, the computing device may instead be a smartphone, a tablet, smartwatch, or other computing device including the same or similar elements as illustrated and described with regard to FIG. 9. Devices, such as smartphones, tablets, and smartwatches, are generally collectively referred to as mobile devices. Further, although the various data storage elements are illustrated as part of the computer 900, the storage may also or alternatively include cloud-based storage accessible via a network, such as the Internet or server based storage.

Memory 903 may include volatile memory 914 and non-volatile memory 908. Computer 900 may include—or have access to a computing environment that includes—a variety of computer-readable media, such as volatile memory 914 and non-volatile memory 908, removable storage 910 and non-removable storage 912. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 900 may include or have access to a computing environment that includes input 906, output 904, and a communication connection 916. Output 904 may include a display device, such as a touchscreen, that also may serve as an input device. The input 906 may include one or more of a touchscreen, touchpad, mouse, keyboard, camera, one or more device-specific buttons, one or more sensors integrated within or coupled via wired or wireless data connections to the computer 900, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 902 of the computer 900. A hard drive, CD-ROM, and RAM are some examples of articles including a non-transitory computer-readable medium such as a storage device. The terms computer-readable medium and storage device do not include carrier waves. For example, a computer program 918 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 900 to provide generic access controls in a COM based computer network system having multiple users and servers. Storage can also include networked storage such as a storage area network (SAN) indicated at 920.

EXAMPLES

In example 1, a method comprises dividing a dataset into partitions by hashing a specified key. A set of distributed storage system nodes is selected as a primary node group for storage of the partitions. A primary copy of the partitions is caused to be stored on the primary node group by a distributed storage system file server such that the location of each partition is known by hashing of the specified key.

In example 2, the method of example 1 further comprises dividing at least one additional dataset into partitions by hashing the specified key, wherein the datasets comprise tables. A primary copy of the partitions of each additional dataset is caused to be stored on corresponding primary node groups by a distributed storage system file server as a function of the hash such that the location of each partition is known.

In example 3, the method of example 2 further comprises optimizing a query utilizing the known locations of partitions.

In example 4, the method of any of examples 2-3 further comprises optimizing a query that includes a join over the tables by performing data shuffles between the partitions where partition groups are different or contained striped partitions.

In example 5, the number of partitions for each of the tables is a power of two for any of examples 2-4.

In example 6, at least one partition is striped across multiple nodes for example 5.

In example 7, the method of any of examples 2-6 further comprises causing a replica copy of the partitions to be stored on a replica node group by the distributed storage system file server wherein each node in the replica node group is not one to one mapped with nodes in the primary node group.

In example 8, the method of any of examples 2-7 further comprises causing a replica copy of the partitions to be stored in accordance with heuristics of the distributed storage system file server.

In example 9, the distributed storage system comprises a Hadoop system and wherein causing a primary copy of the partitions to be stored on the primary node group comprises identifying nodes in a partition group associated with a table to a Hadoop file server using a pluggable BlockPlacementPolicy for any of examples 2-8.

In example 10, a system comprises a processor and a memory device coupled to the processor and having code stored therein to cause the processor to perform a method. The method comprises dividing each of multiple datasets into partitions by hashing a specified key, selecting sets of distributed storage system nodes as primary node groups for storage of the partitions, and causing a primary copy of the partitions of each dataset to be stored on corresponding primary node groups by a distributed storage system file server such that the location of each partition is known by hashing of the specified key.

In example 11, the memory device further comprises code to cause the processor to perform as a query coordinator to communicate with the primary node groups and optimize queries based on the known locations of each partition for example 10.

In example 12, optimizing a query in example 11 includes a join over the multiple datasets is performed by specifying data shuffles between the partitions where partition groups are different or contained striped partitions.

In example 13, the number of partitions for each of the multiple datasets is a power of two for examples 10-12.

In example 14, at least one partition is striped across multiple nodes for example 13.

In example 15, the method further comprises causing a replica copy of the partitions to be stored on a replica node group by the distributed storage system file server wherein each node in the replica node group is not one to one mapped with nodes in the primary node group for any of examples 10-14.

In example 16, the method further comprises causing a replica copy of the partitions to be stored in accordance with heuristics of the distributed storage system file server for any of examples 10-15.

In example 17, the distributed storage system comprises a Hadoop system and wherein causing a primary copy of the partitions to be stored on the primary node group comprises identifying nodes in a partition group associated with a file to a Hadoop file server using a pluggable BlockPlacementPolicy for any of examples 10-16.

In example 18, a method comprises receiving a query, inspecting the query to identify tables being joined and join conditions, identifying partition groups organized using distributed hash tables on a partition key and their sizes associated with multiple tables corresponding to the join conditions, performing a collocated join plan if an equi-join predicate is on partition keys, constructing a collocated join plan if the partition groups are the same, constructing a partition-wise join plan for bracketed exchange between nodes if the partition groups are the same. If the size of the partition groups is not the same, the method further comprises constructing one or more logic partitions to match partitions in the groups, mapping partitions in a larger group to partitions in a smaller group, and constructing a partition-wise join plan for bracketed exchange between the nodes in the large and small groups based on the maps.

In example 19, the number of partitions within a group are a power of two and wherein the partition key is a primary key for example 18.

In example 20, K is defined as the number of partitions in the larger group divided by the number of partitions in the smaller group, and wherein each partition in the smaller group is mapped to K partitions of the larger group for any of examples 18-19.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
    dividing a first dataset including a first plurality of elements into partitions by hashing a key for each of the first plurality of elements to generate a hash value for the key of the element, wherein each element of the first plurality of elements is stored in a partition corresponding to the hash value for the key of the element;
    selecting a set of distributed storage system nodes as a first primary node group for storage of the partitions of the first dataset;
    causing a primary copy of the partitions of the first dataset to be stored on the first primary node group by a distributed storage system file server based on the respective hash values such that the storage system node on which each element of the first plurality of elements is stored is associated with the hash value for the key of the element;
    dividing at least one additional dataset into partitions by hashing a key for each element of the at least one additional dataset to generate a hash value for the key of the element, wherein the datasets comprise tables; and causing a primary copy of the partitions of each additional dataset to be stored on corresponding primary node groups by the distributed storage system file server as a function of hash values such that the storage system node of each partition in the corresponding primary node group is known by hashing of the key, wherein a number of partitions that store each of the tables is a power of two, and wherein at least one partition is striped across multiple nodes of the primary node group.

2. The method of claim 1 and further comprising optimizing a query utilizing known locations of partitions.

3. The method of claim 1 and further comprising optimizing a query that includes a join over the tables by performing data shuffles between pairs of the partitions where partition groups of each pair are different or contained striped partitions.

4. The method of claim 1 and further comprising causing a replica copy of the partitions to be stored on a replica node group by the distributed storage system file server wherein each node in the replica node group is not one to one mapped with nodes in the primary node group.

5. The method of claim 1 and further comprising causing a replica copy of the partitions to be stored in accordance with heuristics of the distributed storage system file server.

6. The method of claim 1 wherein the distributed storage system comprises a Hadoop system and wherein causing a primary copy of the partitions to be stored on the primary node group comprises identifying nodes in a partition group associated with a table to a Hadoop file server using a pluggable BlockPlacementPolicy.

7. A system comprising:
a memory having instructions stored thereon; and
a processor in communication with the memory, wherein the processor executes the instructions to:
divide each of multiple datasets including a plurality of elements into partitions by hashing a key for each of the plurality of elements to generate a hash value for the key of the element, wherein each element of the plurality of elements is stored in a partition corresponding to the hash value for the key of the element;
select sets of distributed storage system nodes as primary node groups for storage of the partitions; and
cause a primary copy of the partitions of each dataset to be stored on corresponding primary node groups by a distributed storage system file server based on the respective hash values such that the storage system node on which each element of the plurality of elements is stored is associated with the hash value for the key of the element, wherein a number of partitions that store each of the multiple datasets is a power of two, and wherein at least one partition is striped across multiple nodes.

8. The system of claim 7 wherein the processor executes the instructions to perform as a query coordinator to communicate with the primary node groups and optimize queries based on known locations of each partition.

9. The system of claim 8 wherein optimizing a query that includes a join over the multiple datasets is performed by specifying data shuffles between pairs of the partitions where partition groups of each pair are different or contained striped partitions.

10. The system of claim 7 wherein the processor executes the instructions to cause a replica copy of the partitions to be stored on a replica node group by the distributed storage system file server wherein each node in the replica node group is not one to one mapped with nodes in the primary node group.

11. The system of claim 7 wherein the processor executes the instructions to cause a replica copy of the partitions to be stored in accordance with heuristics of the distributed storage system file server.

12. The system of claim 7 wherein the distributed storage system comprises a Hadoop system and wherein causing a primary copy of the partitions to be stored on the primary node group comprises identifying nodes in a partition group associated with a file to a Hadoop file server using a pluggable BlockPlacementPolicy.

* * * * *